(12) United States Patent
Vivanco et al.

(10) Patent No.: US 8,873,502 B2
(45) Date of Patent: Oct. 28, 2014

(54) CARRIER SELECTION

(75) Inventors: Daniel A. Vivanco, Herndon, VA (US); Esmail Hejazi Dinan, Herndon, VA (US); Vijay Rudraraju, Herndon, VA (US); Howard Bishop Anderson, Ashburn, VA (US); Hemanth Balaji Pawar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1319 days.

(21) Appl. No.: 12/372,814

(22) Filed: Feb. 18, 2009

(65) Prior Publication Data
US 2010/0210277 A1    Aug. 19, 2010

(51) Int. Cl.
*H04W 72/04* (2009.01)

(52) U.S. Cl.
CPC ................................ *H04W 72/0486* (2013.01)
USPC ......... 370/330; 370/329; 455/509; 455/452.1

(58) Field of Classification Search
CPC ............ H04W 72/04; H04W 72/0413; H04W 72/0412
USPC ........................ 370/330, 329; 455/509, 452.1
See application file for complete search history.

(56) References Cited

U.S. PATENT DOCUMENTS

| 5,778,317 | A  | * | 7/1998 | Kaminsky ..................... 455/450 |
| 2002/0051424 | A1 | * | 5/2002 | Krishnamoorthy et al. .. 370/204 |
| 2007/0099641 | A1 | * | 5/2007 | Lastinger et al. ............. 455/512 |
| 2008/0002733 | A1 |   | 1/2008 | Sutskover |
| 2009/0052464 | A1 | * | 2/2009 | Gardner et al. ............... 370/436 |
| 2011/0026546 | A1 | * | 2/2011 | Zubow et al. ................. 370/480 |

* cited by examiner

*Primary Examiner* — Patrick Edouard
*Assistant Examiner* — Michael Irace

(57) ABSTRACT

First and second indicators of a first available amount of an air-interface resources associated with a first and second channel, respectively, is received. A request for an allocation of an amount of the air-interface resource is received. Based on the request for the allocation, first and second ranking values associated with the first and second channels, respectively are determined. The first and second ranking values are selected such that the efficient allocations receive higher ranks. Based on the first ranking value and the second ranking value, the first frequency band is selected to provide the allocation of the amount of the air-interface resource.

18 Claims, 6 Drawing Sheets

CARRIER SELECTION

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A first indicator of a first available amount of an air-interface resource is received. The first indicator is associated with a first frequency band. A second indicator of a second available amount of the air-interface resource is received. The second indicator is associated with a second frequency band. A request for an allocation of an amount of the air-interface resource is received. Based on the request for the allocation, a first ranking value associated with the first frequency band is determined. The first rank is based on a first remaining amount of the air-interface resource that will be available on the first frequency band if the first frequency band is selected to provide the allocation of the amount of the air-interface resource. Based on the request for the allocation, a second ranking value associated with the second frequency band is determined. The second rank is based on a second remaining amount of the air-interface resource that will be available on the second frequency band if the second frequency band is selected to provide the allocation of the amount of the air-interface resource. Based on the first ranking value and the second ranking value, the first frequency band is selected to provide the allocation of the amount of the air-interface resource.

A plurality of wireless devices are communicated with using at least a first channel and a second channel. The first channel has a first remaining allocation of an air-interface resource. The second channel has a second remaining allocation of the air-interface resource. A request for an allocation amount of the air-interface resource is received. The request is associated with a wireless device. A first ranking value is determined based on a first projected remaining allocation of the air-interface resource on the first channel. The first projected remaining allocation is based on the first remaining allocation and the allocation amount. A second ranking value is determined based on a second projected remaining allocation of the air-interface resource on the second channel. The second projected remaining allocation is based on the second remaining allocation and the allocation amount. Based on the first ranking value and the second ranking value, the allocation amount of the air-interface resource is allocated to the wireless device on the first channel.

A communication system is disclosed. A base station communicates wirelessly with a plurality of wireless devices using at least a first channel and a second channel. The first channel has a first remaining allocation of an air-interface resource. The second channel has a second remaining allocation of the air-interface resource. The communication system allocates a request by a wireless device for an allocation of the air-interface resource to the first channel. This allocation is based on a first projected remaining allocation and a second projected remaining allocation. The allocation of the air-interface resource is a member of a set of allocation amounts.

DETAILED DESCRIPTION

In an embodiment, the number of time and frequency allocations (slots) required for each possible combination of guaranteed service type and modulation and coding schemes is calculated. This forms a set of possible resource allocation requests. For each channel, and each member of the set of resource allocation requests, a ranking value is assigned. By comparing the ranking values for a particular possible resource allocation request among channels, these ranking values may be used to select, in advance, which channel will be assigned the particular possible incoming resource allocation request.

The ranking values are based on the amount of air-interface resources that would be remaining if a particular possible resource allocation request were to be assigned to a particular channel. The ranking values are determined such that situations that may lead to resource inefficiency are ranked lower.

Figure 1:
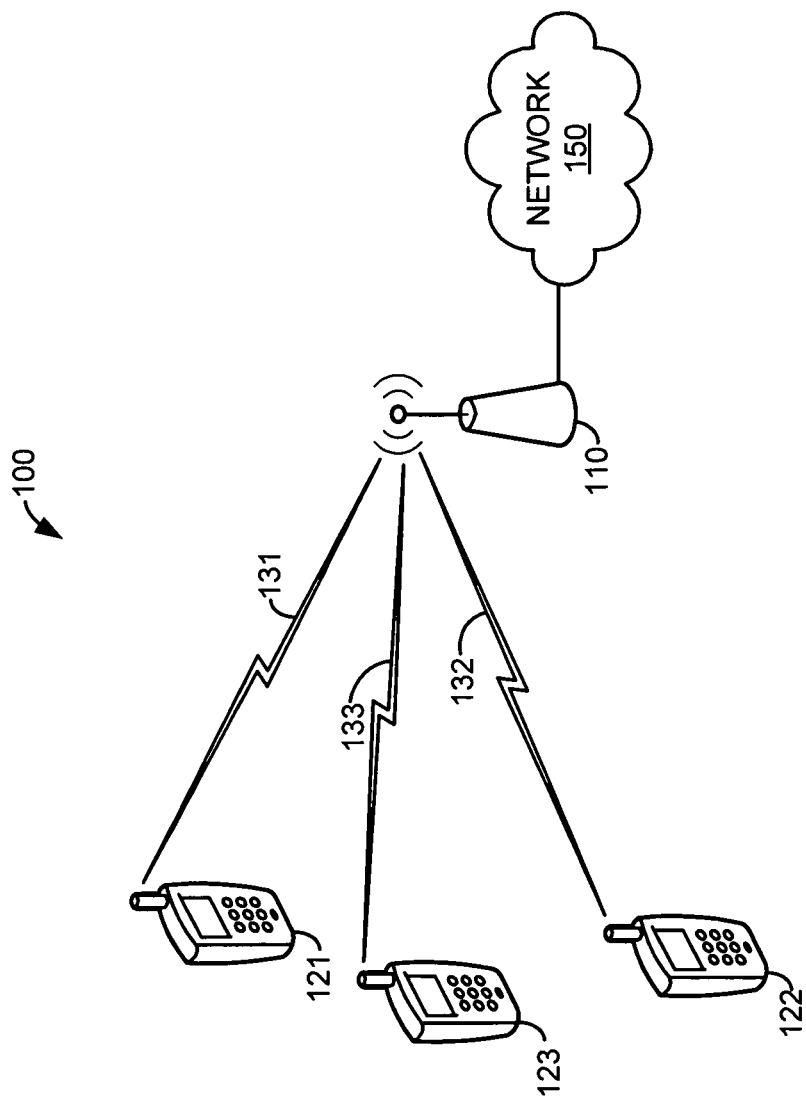
FIG. 1 is a block diagram illustrating a communication system.

FIG. 1 is a block diagram illustrating a communication system. In FIG. 1, communication system 100 comprises base station 110, wireless device 121, wireless device 122, wireless device 123, and network 150. Base station 110 is operatively coupled to network 150. Wireless devices 121-123 may be operatively coupled to base station 110 via wireless links 131-133, respectively. Thus, wireless devices 121-123 may be operatively coupled to network 150 via base station 110.

Wireless devices 121-123 may be any device, system, combination of devices, or other such communication platform capable of communicating with base station 110 using multiple frequency bands (channels). Wireless devices 121-123 may use communication aspects specified by the WiMAX specification including, but not limited to, the channel bandwidths detailed therein. Wireless devices 121-123 may use different modulation and coding schemes (MCSs) to communicate via wireless links 131-133. In an embodiment, a set of modulation coding scheme that wireless devices 121-123 may use to communicate with base station 110 via wireless links 131-133 may include one or more of: QPSK 1/2; QPSK 3/4; 16QAM 1/2; 16QAM 3/4; 64QAM 1/2; 64QAM 2/3; 64QAM 3/4; and, 64QAM 5/6.

Wireless devices 121-123 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple channels. Other types of communication platforms are possible.

Base station 110 may be any wireless system that provides the air interface to wireless devices 121-123 using multiple channels. Base station 110 may also use one or more transmitters. Base station 110 may also use one or more receivers. Base station 110 may be any wireless system that can provide an air interface to wireless devices 121-123. Base station 110 may use communication aspects specified by the WiMAX specification including, but not limited to, channel bandwidths detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, and antennas. Base station 110 may also include other additional components such as a control function or control computer. However, these additional components have been omitted from FIG. 1 for the sake of brevity.

Network 150 may be any network or collection of networks that couple, link, or otherwise operatively connect base station 110 with other devices or systems. Network 150 may include other secondary data networks. In an example, network 150 may include a backhaul network, a local network, a long distance network, or a packet network, or any combination thereof, as well as other types of networks.

In an example, network 150 may be, or include all or parts of an IEEE 802.16 (WiMAX) specified system. These parts may include additional base stations (BSs), an access services network (ASN), access services network gateway (ASN-GW), or connectivity service network (CSN).

In an embodiment, wireless device 121 is using a first channel. Wireless device 122 is using a second channel. Wireless device 121, and other wireless devices (not shown) that are using the first channel are allocated a portion of the total available air-interface resources (slots) on the first channel. Thus, there is a first remaining number of slots available on the first channel. Likewise, Wireless device 122, and other wireless devices (not shown) that are using the second channel are allocated a portion of the total number of slots on the second channel. Thus, there is a second remaining number of slots available on the second channel.

To exchange communication services with network 150 via base station 110, wireless device 123 may request communication resources from base station 110. For example, wireless device 123 may request to communicate a packet with base station 110. In another example, wireless device may request an allocation of communication resources from base station 110. This request may be for an allocation of a service flow. The service flow may be associated with voice services and/or data services. These voice and data services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

To receive one or more of these services, traffic flows may be exchanged between wireless device 123 and base station 110. These traffic flows may have one or more service flow classifications. For example, base station 110 may exchange a traffic flow with wireless device 123 that includes a service traffic flow classification for voice service and a service traffic flow classification for a web browsing service. The service traffic flow classifications for voice service and for web browsing service may have different quality of service (QoS) requirements. In an embodiment, the traffic flows for these services have different service flow classifications.

In an embodiment, some or all of these different service flow classifications may be associated with a guaranteed bandwidth. In other words, communication system 100 may be committed to providing a certain amount of bandwidth (i.e., bits per second) to each traffic flow with a particular service flow classification. To accomplish this, a predefined number of slots may be allocated to a particular service flow when the traffic flow is established. This predefined number of slots may be based on the bandwidth required by the service flow classification and the modulation and coding scheme being used to communicate the traffic flow.

In an embodiment, the service flow classifications may include wireless traffic classifications. For example, for WiMAX wireless communication there are wireless traffic quality of service classifications that include: unsolicited grant service (UGS), real time polling service (rtPS), extended real time polling service (ertPS), non-real time polling service (nRTPS), and best effort (BE). In an embodiment, with the exception of best effort, communication system 100 may be committed to providing a predefined amount of throughput to each of these wireless traffic quality of service classifications. Thus, when traffic flows are established, communication system 100 may allocate a predefined number of slots to traffic flows with these service flow classifications.

For example, wireless device 121 may be communicating a UGS traffic flow that requires a throughput of 3 Mbps. Wireless device 122 may be communicating an rtPS traffic flow that requires a throughput of 2 Mbps. Wireless device 121 may be utilizing 64 QAM 5/6 to communicate with base station 110. Since 64 QAM 5/6 carries 5 bits per symbol, there are 48 symbols in each slot, and the UGS traffic flow wireless device 121 is communicating requires a throughput of 3 Mbps, then the number of slots per second (r) this UGS traffic flow requires is 12,500 slots/s. This is determined according to the formula:

$$r = \frac{\text{maximum throughput}}{(MCS \text{ bits per symbol})(\text{symbols per slot})} = \frac{3 \text{ Mbps}}{(5)(48)} = 12{,}500 \frac{\text{slots}}{\text{s}}.$$

Wireless device 122 may be utilizing 16 QAM 3/4 to communicate with base station 110. Since 16 QAM 3/4 carries 3 bits per symbol, there are 48 symbols in each slot, and the rtPS traffic flow that wireless device 122 is communicating requires a throughput of 2 Mbps, then the number of slots per second this rtPS traffic flow requires is 13,890 slots/s. Thus, it should be noted that the predefined number of slots for each traffic flow depend upon both the service flow classification and the modulation and coding scheme being used to communicate that traffic flow.

In an embodiment, communication system 100 precalculates the number of slots per second required by each combination of service flow classification and MCS. This generates a set of possible resource allocation amounts. In other words, each possible slot allocation amount is precalculated by communication system 100 based on each possible combination of service flow classification requirement and MCS.

For each combination of channel and possible resource allocation amount, communication system 100 may then determine a ranking value. The ranking value for a particular allocation amount and channel is based on the amount of the air-interface resource that will be remaining if that channel is chosen to provide the allocation amount. The ranking value is determined such that situations that may lead to resource inefficiency are ranked lower.

For example, consider a possible requested allocation amount of 6 slots/s. In addition, in this example: (1) the minimum allocation amount from the set of possible allocation amounts is 4 slots/s; (2) the first remaining number of slots available on the first channel is 8 slots/s; and, (3) the second remaining number of slots available on the second channel is 10 slots/s. In this case, communication system 100 would rank the second channel higher than the first channel for the possible allocation amount of 6 slots/s. It would do this because allocating 6 slots/s to the first channel would leave the first channel with 2 slots/s remaining which is not enough to satisfy even a minimum possible allocation amount of 4 slots/s. In contrast, allocating 6 slots/s from the second channel would still allow at least the allocation of a minimum possible allocation amount of 4 slots/s. Thus, selecting the higher ranked channel in this situation helps avoid the inefficient possibility of having 2 slots/s unable to be used.

In an embodiment, wireless device 123 may request an allocation of air-interface resources from base station 110. Wireless device 123 may seek these air-interface resources as a new wireless device becoming active, as an idle user becoming active, as part of an initial registration procedure, due to a handoff from another base station (not shown), or as part of setting up a new traffic flow to receive services from network 150.

Because communication system 100 has precalculated the number of slots per second required by each combination of service flow classification and MCS, the amount of air-interface resources requested by wireless device 123 will be a member of the set of possible resource allocation amounts. In addition, if communication system 100 has determined ranking values for each combination of channel and possible resource allocation amount, communication system 100 can immediately assign a channel to provide the allocation amount based on these precalculated ranking values. In other words, when wireless device 123 requests a certain amount of air-interface resources, communication system 100 is able to match that amount with precalculated ranking values for each channel. The channel associated with that highest ranking value is then selected to provide the air-interface resources to wireless device 123. In another embodiment, the ranking values may not be precalculated. Instead, they may be calculated in response to the request for air-interface resources.

Figure 4:
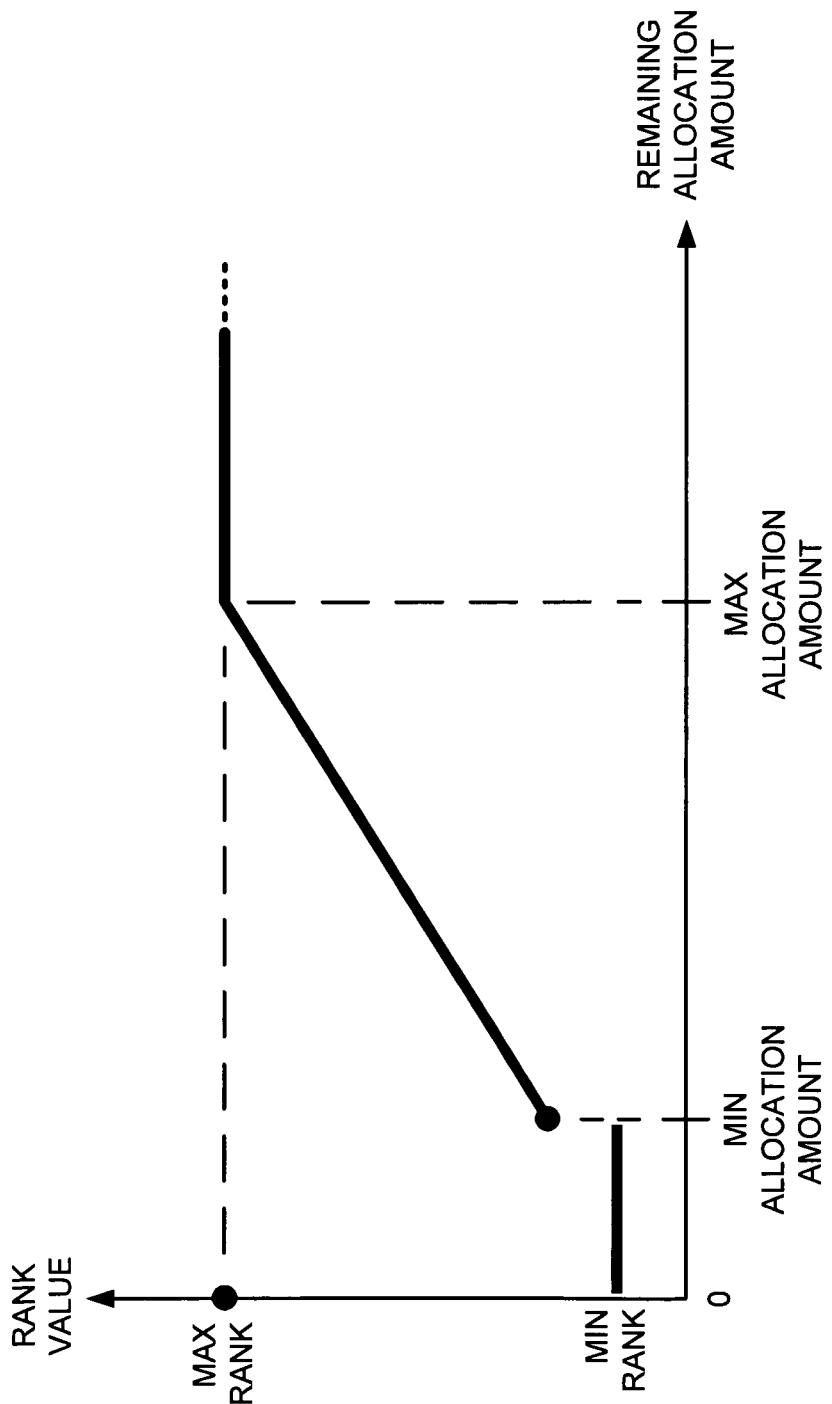
FIG. 4 is an illustration of remaining allocation amounts versus rank value.

The ranking values may be determined as follows: (1) a remaining amount of slots equal to zero gets assigned the maximum ranking value (e.g., 1.0); (2) remaining amounts of slots less than the minimum allocation amount from the set of possible allocation amounts gets assigned the minimum ranking value (e.g., 0.0); (3) the ranking assigned to remaining amounts between the minimum allocation amount and the maximum possible allocation amount has a positive slope; and, (4) remaining amounts greater than the maximum possible allocation amount are assigned the maximum ranking value (e.g., 1.0). An illustration of this remaining allocation amounts versus rank value is shown in FIG. 4.

Figure 2:
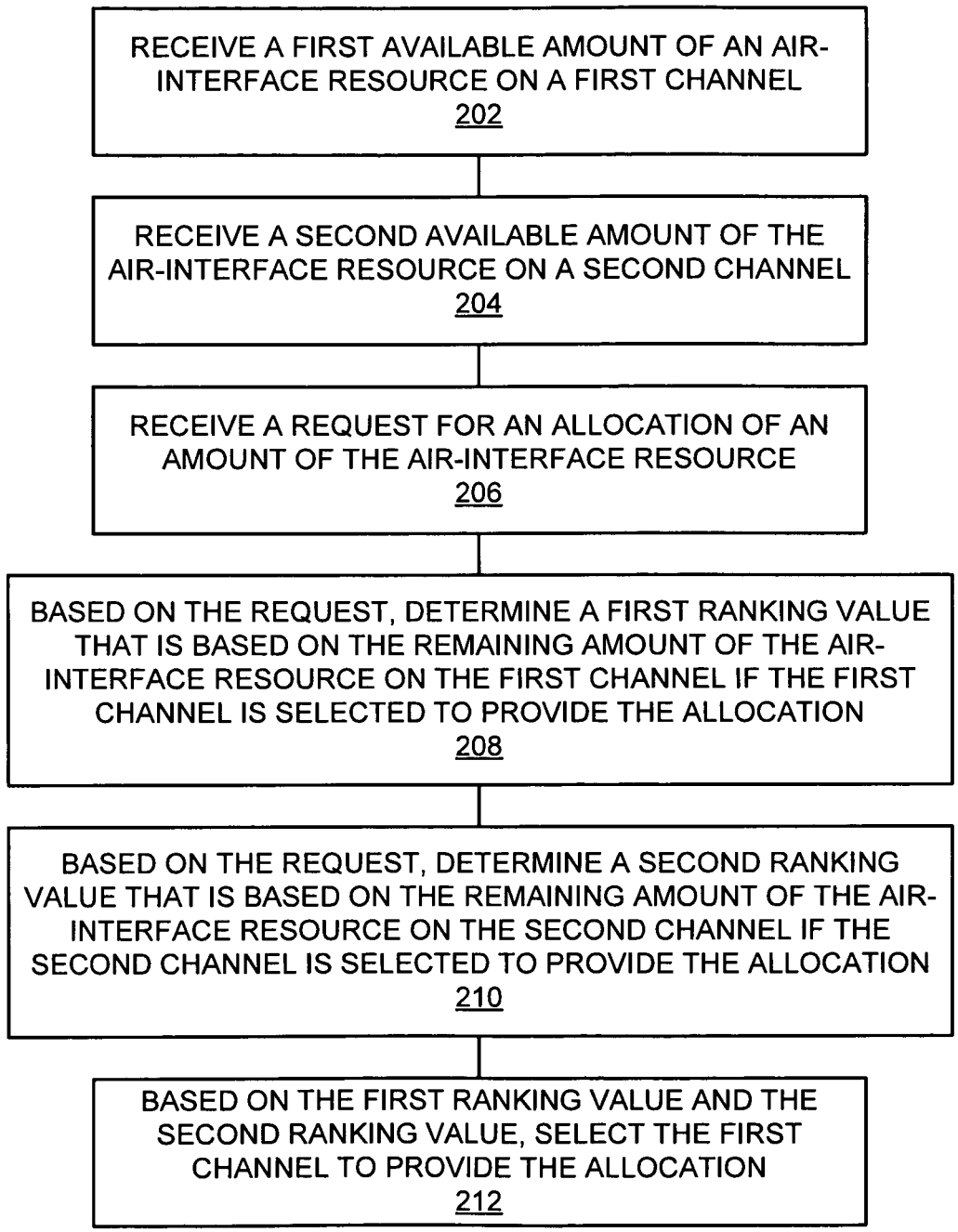
FIG. 2 is a flowchart illustrating a method of operating a communication system.

FIG. 2 is a flowchart illustrating a method of operating a communication system. The steps illustrated in FIG. 2 may be performed by one or more elements of communication system 100.

A first available amount of an air-interface resource on a first channel is received (202). For example, communication system 100 may receive or determine an indicator of the number of available (or unallocated) slots remaining on the first channel. A second available amount of an air-interface resource on a second channel is received (204). For example, communication system 100 may receive or determine an indicator of the number of available (or unallocated) slots remaining on the second channel.

A request for an allocation of an amount of the air-interface resource is received (206). For example, wireless device 123 may request a UGS service flow requiring 3 Mbps. Because wireless device 123 is using 64 QAM 5/6, communication system 100 may determine that wireless device 123 needs 12,500 slots/s.

Based on the request, a first ranking value that is based on the remaining amount of the air-interface resource on the first channel if the first channel is selected to provide the allocation is determined (208). For example, if the first available amount of an air-interface resource on the first channel is 37,500 slots/s, and a maximum possible allocation amount is 20,000 slots/s, then a maximum ranking value of 1.0 may be determined based on the value of 25,000 slots/s. This is the amount of air-interface resource on the first channel if the first channel were to be selected to provide the allocation of 12,500 slots/s (i.e., 37,500−12,500=25,000 slots/s). In another example, if the first available amount of an air-interface resource on the first channel is 12,500 slots/s, then a maximum ranking value of 1.0 may be determined based on the value of zero (0.0) slots/s.

Based on the request, a second ranking value that is based on the remaining amount of the air-interface resource on a second channel if the second channel is selected to provide the allocation is determined (210). For example, if the second available amount of an air-interface resource on the second channel is 15,500 slots/s, and a minimum allocation amount is 5,000 slots/s, then a ranking value of zero (0.0) may be determined based on the value of 3,000 slots/s. This is the amount of air-interface resource on the second channel if the second channel were to be selected to provide the allocation of 12,500 slots/s (i.e., 15,500−12,500=3,000 slots/s).

Based on the first ranking value and the second ranking value, the first channel is selected to provide the allocation (212). For example, based on the example ranking values of 1.0 for the first channel, and 0.0 for the second channel, the first channel may be selected to provide the requested allocation to wireless device 123.

Figure 3:
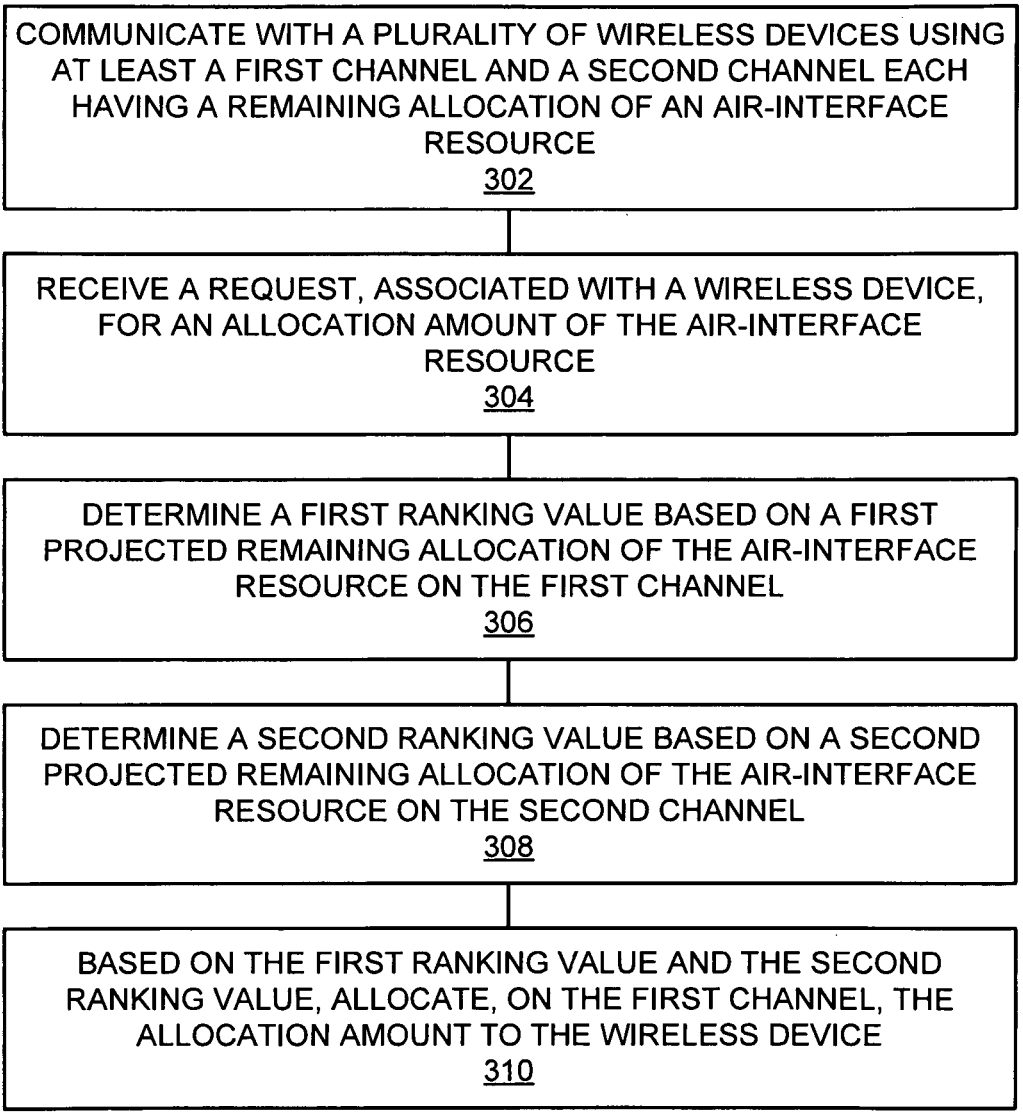
FIG. 3 is a flowchart illustrating a method of operating a communication system.

FIG. 3 is a flowchart illustrating a method of operating a communication system. The steps illustrated in FIG. 3 may be performed by one or more elements of communication system 100.

A plurality of wireless devices are communicated with using at least a first channel and a second channel, each channel having a remaining allocation of an air-interface resource (302). For example, base station 110 may communicate with wireless devices 121 and 122. Base station 110 may use a first channel to communicate with wireless device 121. This first channel may have a remaining allocation of slots. For example, the first channel may have a remaining allocation of X slots/s. Base station 110 may use a second channel to communicate with wireless device 122. This second channel may have a remaining allocation of slots. For example, the second channel may have a remaining allocation of Y slots/s.

A request associated with a wireless device for an allocation amount of the air-interface resource is received (304). For example, wireless device 123 may request an allocation of Z slots/s. The Z amount may be based on a throughput desired by wireless device 123, and the MCS that base station 110 is using to communicate with wireless device 123.

A first ranking value based on a first projected remaining allocation of the air-interface resource on the first channel is determined (306). For example, communication system 100 may determine a ranking value associated with the first channel by projecting that P slots/s will be remaining on the first channel if the first channel is selected. P may be determined by the equation X−Z=P.

A second ranking value based on a first projected remaining allocation of the air-interface resource on the first channel is determined (306). For example, communication system 100 may determine a ranking value associated with the second channel by projecting that Q slots/s will be remaining on the first channel if the first channel is selected. Q may be determined by the equation X−Z=P. The first and second ranking values may be determined such that the first ranking value is greater than the second ranking value if P>Q and Q≠0.

Based on the first ranking value and the second ranking value, the allocation amount is allocated to the wireless device (310). For example, based on the first ranking value being greater than the second ranking value, communication system 100 may allocate the requested allocation amount of Z slots/s to wireless device 123.

FIG. 4 is an illustration of remaining allocation amounts versus rank value. This relationship between remaining allocation amount versus rank value may be used by communication system 100 or the methods discussed previously. In FIG. 4, the ranking values on the Y-axis versus the remaining allocation amount on the X-axis are as follows: (1) a remaining amount of slots equal to zero gets assigned the maximum ranking value (e.g., 1.0); (2) remaining amounts of slots less than the minimum allocation amount from the set of possible allocation amounts gets assigned the minimum ranking value (e.g., 0.0); (3) the ranking assigned to remaining amounts between the minimum allocation amount and the maximum possible allocation amount has a positive slope; and, (4) remaining amounts greater than the maximum possible allocation amount are assigned the maximum ranking value (e.g., 1.0). It should be understood that the straight line slope shown between the minimum allocation amount and the maximum allocation amount is for illustration purposes. Other curve shapes such as parabolic, exponential, hyperbolic may be used. In addition, discrete assignments of ranking values for each possible remaining allocation amount may be used.

Figure 5:
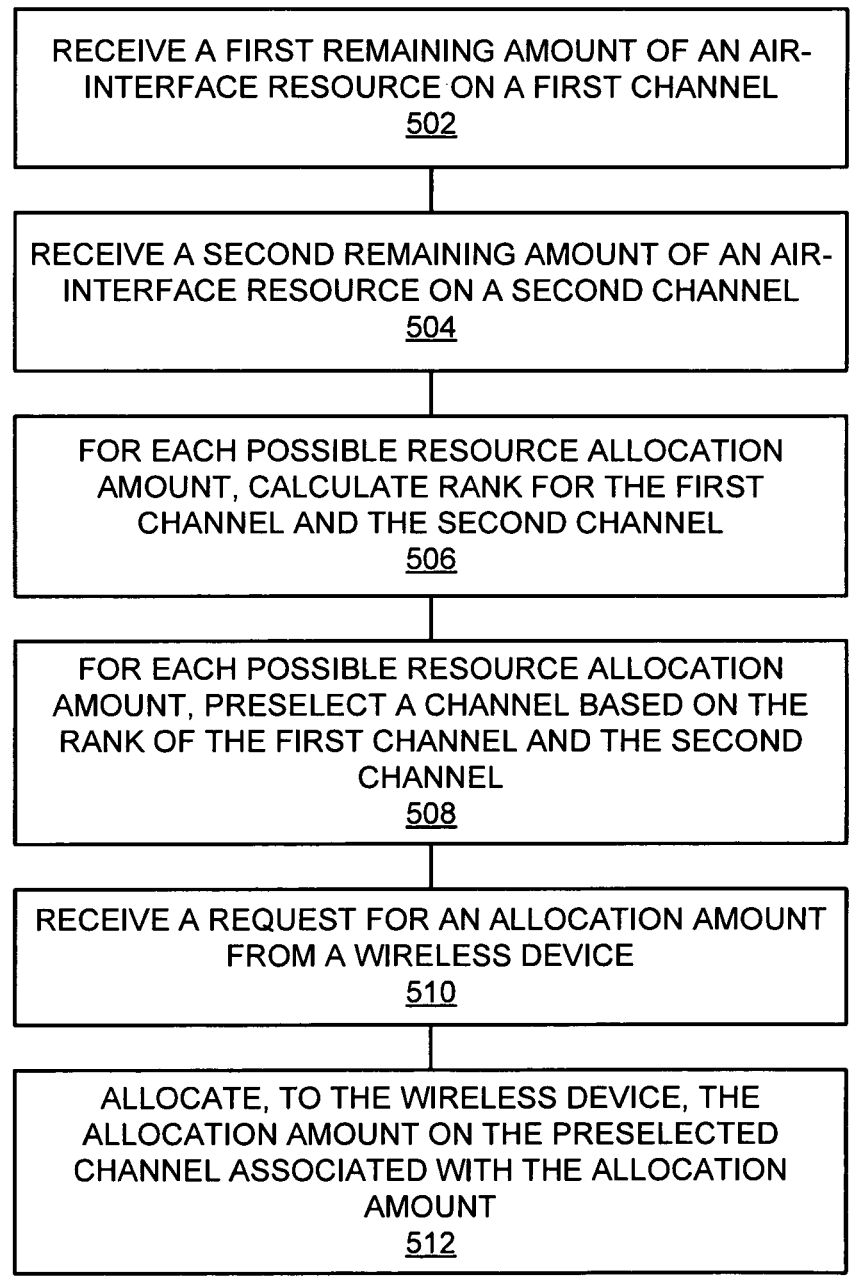
FIG. 5 is a flowchart illustrating a method of allocating a request to a channel.

FIG. 5 is a flowchart illustrating a method of allocating a request to a channel. The steps illustrated in FIG. 5 may be performed by one or more elements of communication system 100.

A first remaining amount of an air-interface resource on a first channel is received (502). For example, communication system 100 may receive or determine the number of available (or unallocated) slots remaining on the first channel. A second remaining amount of an air-interface resource on a second channel is received (504). For example, communication system 100 may receive or determine the number of available (or unallocated) slots remaining on the second channel.

For each possible resource allocation amount, a rank for the first channel and the second channel is calculated (506). For example, for each combination of channel and possible resource allocation amount, communication system 100 may determine a ranking value. The ranking value for a particular allocation amount and channel may be based on the amount of the air-interface resource that will be remaining if that channel is chosen to provide the allocation amount. The ranking value may be determined such that that situations that may lead to resource inefficiency are ranked lower.

For each possible resource allocation amount, a channel is preselected based on the rank of the first channel and the second channel (508). For example, after ranking each of the first channel and second channel versus each possible resource allocation amount, communication system 100 may select a channel for each possible resource allocation amount. A particular selection for a particular resource allocation amount may be based on the ranks of the first and second channel for that resource allocation amount.

A request is received from a wireless device for an allocation amount (510). For example, wireless device 123 may request an allocation amount. The allocation amount is allocated, on the preselected channel associated with the allocation amount, to the wireless device (512). For example, communication system 100 may allocate the requested allocation amount to wireless device 123 on the first channel because the first channel was preselected in block 510 to be associated with the allocation amount that wireless device 123 requested.

The methods, systems, devices, networks, and base stations described above may be implemented with, contain, or be executed by one or more computer systems. The methods described above may also be stored on a computer readable medium. Many of the elements of communication network 100 may be, comprise, or include computers systems. This includes, but is not limited to: base station 110, wireless device 121, wireless device 122, wireless device 123, and network 150.

Figure 6:
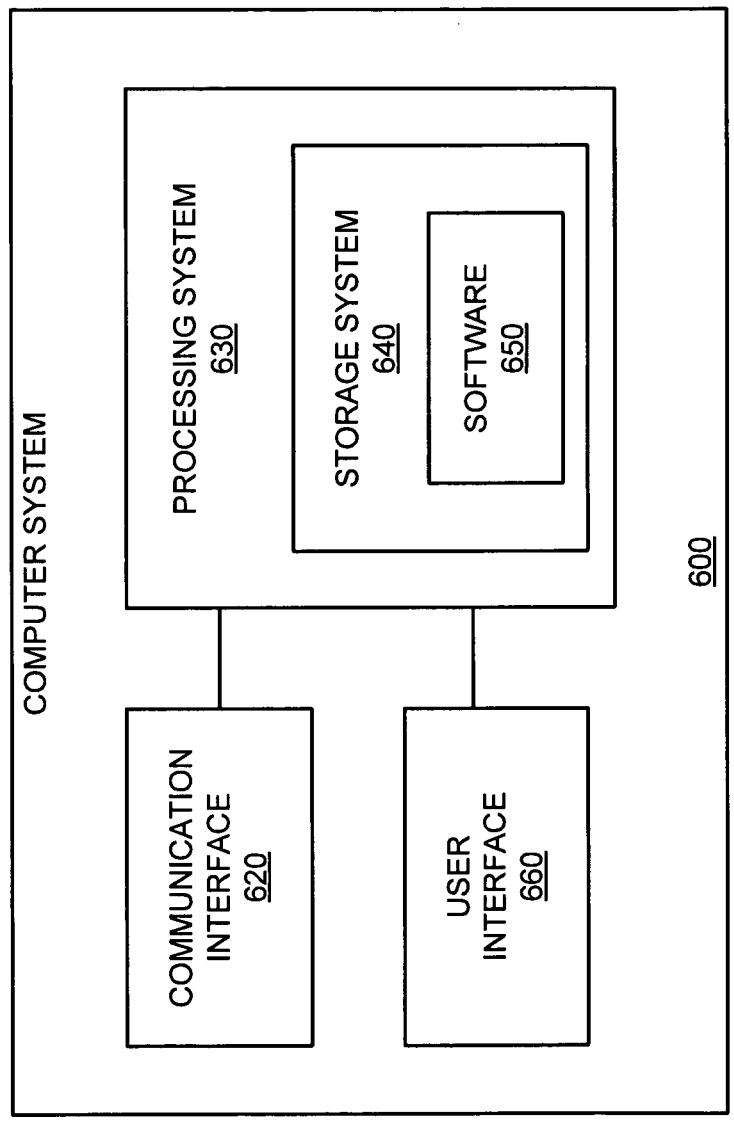
FIG. 6 is a block diagram of a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
    receiving, by a node of the communication system, an indicator of a first available amount of an air-interface resource of a first channel of the communication system;
    receiving, by the node, an indicator of a second available amount of the air-interface resource of a second channel of the communication system;
    receiving, by the node, a request for allocation of an amount of the air-interface resource that is less than or equal to the first available amount and to the second available amount;
    determining, by the node, a first channel ranking value based on the amount of the requested air-interface resource and on a first remaining amount of the air-interface resource that will be available on the first channel if the first channel is selected to satisfy the request for allocation, wherein the first channel ranking value comprises a first value within a range from a minimum ranking value to a maximum ranking value and is selected to be the maximum value when the remaining amount of the air-interface resource that will be available on the first channel if the first channel is selected is zero;
    determining, by the node, a second channel ranking value based on the amount of the requested air-interface resource and on a second remaining amount of the air-interface resource that will be available on the second channel if the second channel is selected to satisfy the request for allocation; and,
    selecting, by the node, one of the first channel and the second channel to satisfy the request for allocation based on the first channel ranking value and the second ranking channel value.

2. The method of claim 1, wherein the request for an allocation of an amount of the air-interface resource is selected from a finite set of allocation amounts for the wireless device.

3. The method of claim 2, wherein a channel ranking value for a particular channel comprises a value within a range from a minimum ranking value to a maximum ranking value and is selected to be the maximum value when the remaining amount of the air-interface resource that will be available on the particular channel if the particular channel is selected is greater than the largest member of the finite set of allocation amounts.

4. The method of claim 2, wherein a channel ranking value of a particular channel has a positive correlation to the remaining amount of the air-interface resource that will be available on the particular channel when the remaining amount of the air-interface resource that will be available on the particular channel is greater than or equal to the smallest member of the finite set of allocation amounts and smaller than or equal to the largest member of the finite set of allocation amounts.

5. The method of claim 2, wherein members of the finite set of allocation amounts are based on a set of modulation and coding schemes.

6. The method of claim 2, wherein members of the finite set of allocation amounts are based on a set of service flow classifications.

7. The method of claim 6, wherein the members of the finite set of allocation amounts are further based on a set of modulation and coding schemes.

8. A method of operating a communication system, comprising:
    communicating, by a node of the communication system, with a plurality of wireless devices using at least a first channel and a second channel, the first channel having a first remaining allocation of an air-interface resource, the second channel having a second remaining allocation of the air-interface resource;
    receiving, by the node, a request for an allocation amount of the air-interface resource that is less than or equal to the first available remaining allocation and the second remaining allocation;
    determining, by the node, a first ranking value based on a first projected remaining allocation of the air-interface resource on the first channel, the first projected remaining allocation being based on the first remaining allocation and the allocation amount, wherein the first ranking value comprises a first value within a range from a minimum ranking value to a maximum ranking value and is selected to be the maximum value when the remaining amount of the air-interface resource that will be available on the first channel if the first channel is selected is zero;
    determining, by the node, a second ranking value based on a second projected remaining allocation of the air-interface resource on the second channel, the second projected remaining allocation being based on the second remaining allocation and the allocation amount; and,
    based on the first ranking value and the second ranking value, allocating, by the node, on the first channel, the allocation amount of the air-interface resource to the wireless device on the channel in which the remaining amount of the air-interface resource reduces resource usage inefficiency of the air-interface resource.

9. The method of claim 8, wherein the request for an allocation amount of the air-interface resource is selected from a finite set of allocation amounts for the wireless device.

10. The method of claim 9, wherein a reduction of resource usage inefficiency of a particular channel has a maximum value when the projected remaining allocation on the particular channel is greater than the largest member of the finite set of allocation amounts.

11. The method of claim 9, wherein, a reduction of resource usage inefficiency of a particular channel has a positive correlation to the projected remaining allocation on the particular channel, when the projected remaining allocation on the particular channel is within a range from the smallest allocation amount to the largest allocation amount of the finite set of allocation amounts.

12. The method of claim 11, wherein the air-interface resource corresponds to allocations of time and frequency.

13. A communication system comprising:

a base station communicating wirelessly with a plurality of wireless devices using at least a first channel and a second channel, the first channel having a first remaining allocation of an air-interface resource, the second channel having a second remaining allocation of the air-interface resource; and a computer system logically coupled to the base station for allocating a request by a wireless device for an allocation of the air-interface resource to the first channel based on a projected remaining allocation of the air-interface resource on the first channel and on the second channel, the allocation of the air-interface resource being a member of a finite set of allocation amounts for the wireless device, when the projected remaining amount of the air-interface resource on the first channel provides a higher resource usage efficiency than the projected remaining amount of the air-interface resource on the second channel, wherein the resource usage efficiency is based upon a channel ranking value for a particular channel that comprises a first value within a range from a minimum ranking value to a maximum ranking value and is selected to be the maximum value when the projected remaining amount of the air-interface resource that will be available on the particular channel if the particular channel is selected is zero.

14. The communication system of claim 13, wherein the request by the wireless device is allocated to the first channel based on the projected remaining amount of the air-interface resource on the first channel being zero.

15. The communication system of claim 13, wherein the request by the wireless device is allocated to the first channel based on the projected remaining amount of the air-interface resource on the first channel being one of zero and greater or equal than the smallest member of the finite set of allocation amounts for the wireless device.

16. The communication system of claim 13, wherein the request by the wireless device is allocated to the first channel based on the projected remaining amount of the air-interface resource on the first channel being one of zero and greater than the largest member of the finite set of allocation amounts for the wireless device.

17. The method of claim 1, wherein the node of the communication system comprises one of a base station and an access service network gateway.

18. The method of claim 8, wherein the node of the communication system comprises one of a base station and an access service network gateway.

* * * * *